Patented Jan. 26, 1954

2,667,070

UNITED STATES PATENT OFFICE 2,667,070

DYE SOLUTION FLAW INSPECTION METHOD

Loy W. Sockman, Los Angeles, and Elliot W. Brady, Inglewood, Calif., assignors, by mesne assignments, to Northrop Aircraft, Inc., Hawthorne, Calif., a corporation of California Application March 26, 1949, Serial No. 83,614

9 Claims. (Cl. 73—104)

The present invention relates to flaw inspection, and more particularly to an improved method that is capable of inspecting parts for minute surface flaws that are not apparent by prior methods of inspection.

The present invention is particularly valuable for the inspection of case welded, or forged metal parts prior to use during which the metal part is subject to high stresses.

Many types of penetrants have heretofore been used to locate flaws or discontinuities in metallic or nonmetallic surfaces. The usual method was to apply the penetrant, then wash or wipe off the surface. Any surface flaw would be revealed by seepage of the penetrant from the crevice or cavity. Various indications, dyes, couplers, and fluorescent mixtures have been added to the penetrant to increase the visibility of the seepage, and absorbent powders were often applied to spread the penetrant around the flaw to magnify the defect.

Such a penetrant must have a very low surface tension if it is to penetrate the finest flaws. This allows the liquid to "wet" the surface and spread over it and into any cavities or crevices present. Capillarity may also aid penetration.

After the excess penetrant is removed from the surface, the pockets of penetrant entrapped in the smaller flaws will be retained by capillarity. If the surface opening of the flaw is large enough, the particles of absorbent deposited on the surface may reach the meniscus at top of the retained penetrant and allow it to creep out by capillarity. Obviously however, this action fails to materialize in the case of very small cracks, because the finest powder used for blotting is too coarse to reach the liquid surface.

It is an object of the present invention to provide a method for surface flaw inspection of the penetrant-developer type, in which a penetrant is used that will enter the finest cracks, and which will readily creep out to form an indication of the flaw.

It is another object of the invention to provide a novel method of developing a clear trace of a flaw having a dye penetrant therein.

It is still another object of the present invention to provide a method of creating a magnified clear trace of a flaw.

It is still another object of the present invention to provide a method of preserving a permanent record of an inspection made by a dye penetrant-developer method.

The present invention utilizes a penetrant with a low initial surface tension and which rapidly increases in surface tension by evaporation. The penetrant contains a relatively non-volatile liquid with a high surface tension, dissolved in a more volatile solvent with a lower surface tension. A suitable dye or indicator is added to the penetrant. After the penetrant solution has filled the flaw and the excess has been removed, the more volatile solvent begins to evaporate at the exposed surface. The volatile solvent evaporates faster than it is replaced by diffusion, the relatively non-volatile and high surface tension liquid content of the outer portion of the trapped dye solution thus increases, raising its surface tension above that in the body of the dye solution.

This action results in creep-out to the metal surface, where a dye absorber spreads it by capillarity into an extended, magnified pattern many times larger than the flaw.

In more specific terms, the present invention includes the use of a penetrant dye solution composed primarily of one or more of the relatively non-volatile, high surface tension organic liquids exemplified by plasticizers in the plastic art, mixed with a volatile lower surface tension liquid and containing a suitable dye, preferably red in color. This penetrant dye containing liquid is applied to the surface of a part to be inspected, and after a short interval, is cleaned from the surface. The clean surface is then covered with a thin coating of a finely divided dye absorber, preferably white in color, this dye absorber preferably being suspended in a quick evaporative liquid. The spaces between the particles of dye absorber form fine capillaries which absorb the dye from the (comparatively) much larger defect. This bleeding of the penetrant trapped in the flaw into the dry developer coating, stains the developer coating in an expanded, clearly visible pattern and reveals the defect. We reduce viscosity and surface tension by dissolving a high surface tension, relatively non-vaporizing, viscous organic liquid in a more volatile low surface tension solvent of equal or greater volume so that the mixture readily penetrates the smallest flaws. In some cases penetration can be further increased by the addition of suitable surface active "wetting agents," many of which are well known in the art.

As examples of high surface tension, low volatility liquids that have been tested experimentally and found satisfactory for flaw inspection, we have used benzyl alcohol, amyl, di-amyl, butyl, dibutyl, ethyl, di-ethyl, methyl and di-methyl, acetates, butyrates, citrates, cinnamates, ethers, salicylates, glycolates, phthalates, maleates, sebacates, succinates and proprionates, excluding however low volatility liquids that may contain hydrocarbon oils. The satisfactory low volatility liquids may thus be characterized as being oil free.

A diluent for the high surface tension, low volatility liquid used to reduce viscosity and surface tension can be an alcohol, ether, ester, ketone or halogen derivative or mixtures thereof or even water in the case of polar liquids, the main consideration being only that the high surface tension, low volatility liquid be soluble therein, and that the diluent be more volatile and have a lower surface tension than said liquid.

The dye used should be soluble in the penetrant solution in an amount sufficient to provide a sharply contrasting trace in the developer coating. Alizarin base red dye has been found highly satisfactory, although many other dye types and colors can be used and in some cases alcohol or water soluble dyes can be used.

The developer material can be any finely divided material that will provide a coating of a color contrasting with that of the penetrant dye. White materials are preferred and precipitated chalks, zinc oxide or both have been found satisfactory.

The liquid in which the developer material is suspended is not critical but rapidly evaporating liquids are preferred for time reduction. Ethyl alcohol has been found highly satisfactory.

In case a permanent record is desired, the stained developer coating can be photographed, but it is preferred to make a permanent record of a defect stain by applying a transparent adhesive member to the developer coating around a stain indicating a flaw or defect. Such an adhesive member picks up both the dyed portion and the background of the developer coating and the tape may then be applied and attached to a record sheet such as an inspection notebook page or a card suitable for filing. The stain is thus preserved and can be viewed as desired through the transparent member.

Other objects and advantages of the present invention may be more fully understood by the ensuing description of a preferred form of the process of the present invention and to a description of the attached drawings in which.

Figure 1:
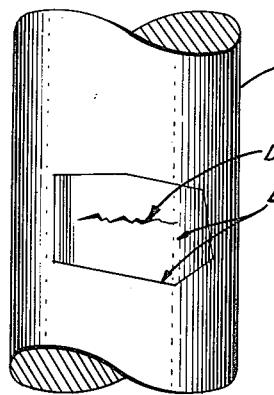
Figure 1 is a diagrammatic view of a flaw stain in a developer coating applied to a metal part.

A preferred dye penetrant found to be highly satisfactory is as follows:

Volatile low surface tension liquid—50-75% ethylene glycol monobutyl ether
Relatively non-volatile high surface tension liquid—50-25% dibutyl phthalate.
Mix and saturate with Mefford No. 322 red dye.

The parts to be inspected are to be clean and free from grease, and critical areas where defects may be expected should preferably be polished for best results. The parts are then immersed in the penetrant for about five minutes. Other known penetrants used for this purpose require from twenty minutes to an hour or more. If the quantity of parts does not justify the use of a tank, then the parts can be painted or sprayed with the penetrant.

The excess dye is then removed from the surface of the part, preferably by transferring the part immediately into a cleaning fluid which may be kerosene or Stoddards solvent.

The cleaning fluid and any remaining dye is then removed from the surface of the part by flushing with water, and the parts are allowed to dry, or are blown dry with air. If the use of water on the parts is not desirable, then the solvent may be removed by wiping.

A quick-drying liquid developer is preferred.

A preferred developer is as follows:

25% precipitated chalk (by volume)
75% ethyl alcohol

The parts are then dipped individually or in racks in the developer, then removed and allowed to dry. The developer can also be applied with a brush or spray gun.

The parts should be inspected as soon as the developer coat dries and defects are indicated by the bleeding of the dye penetrant retained in a defect, into the developer coat. Cracks and porosities can be identified by their characteristic developed pattern, and the amount of bleeding of the dye penetrant into the developer coat with respect to time is a clue to the depth of the defect.

While the defect stain in the developer coating can be recorded clearly by photography, a quicker and simpler method of making a permanent record of a developed defect stain is shown in the drawings.

Figure 2:
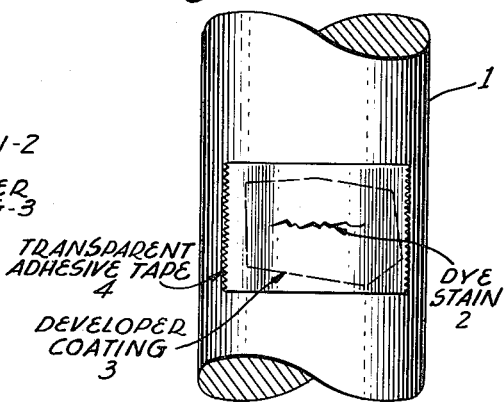
Figure 2 is a diagram showing the application of a transparent adhesive tape to the developer coating.

In Figure 1, a part 1 is shown, such as a shaft for example, in which a red defect stain 2 is shown against the white chalk developer coat 3. The developer coat 3 is wiped off around defect stain 2, and a piece of removable adhesive tape 4, preferably transparent, is applied to the shaft to surround the remaining developer coat and the defect stain, as shown in Figure 2. The removable adhesive tape known in the art as "scotch" tape has been found to be satisfactory for this purpose.

Figure 3:
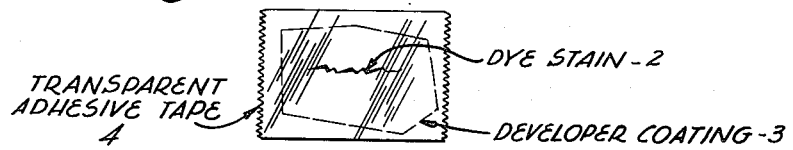
Figure 3 is a diagram of the removed tape.
Figure 4:
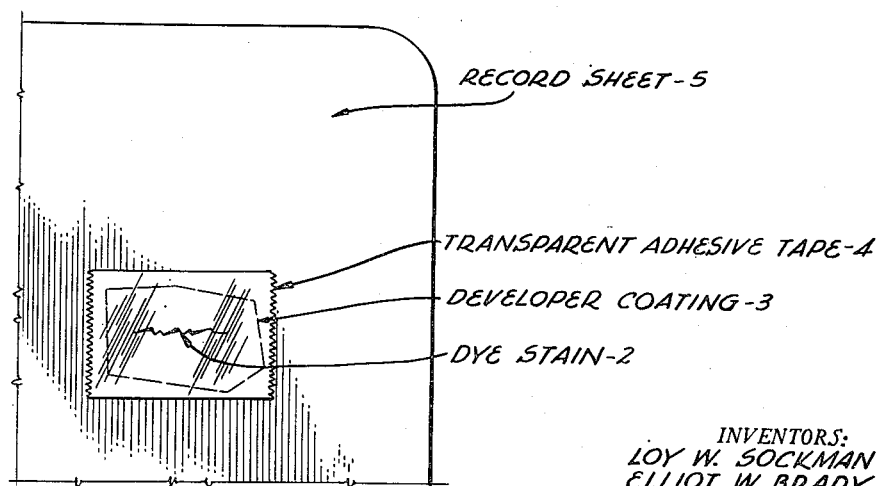
Figure 4 is a diagram of the tape applied to a record sheet.

The tape is then removed as shown in Figure 3. It will be found that most of the developer coat, together with the red trace will be picked up by the tape. The tape with the record thereon can then be stuck to a record sheet 5 as shown in Figure 4. This record sheet may be a notebook page or a card suitable for filing, and a permanent record is quickly obtained. The tape adheres well to the record sheet when the developer coat covers less than the full extent of the tape.

The process as above described has been found to be greatly superior to prior dye penetrant-developer coat processes in that minute defects such as fine cracks have repeatedly been found by the use of the present process that cannot be developed by prior inspection methods known to us.

Within the scope of the appended claims, various modifications and changes in the nature and proportions of the ingredients may be made by those skilled in the art without departing from the nature of the invention.

What is claimed is:

1. The method of inspecting a part for surface defects comprising cleaning a surface of said part, immersing a surface of said part in a penetrant consisting in parts by volume of 50-75% ethylene glycol monobutyl ether
50-25% dibutyl phthalate substantially saturated with a dye soluble in said penetrant, removing penetrant from said surface, depositing on said surface a developer consisting of in parts by volume of 25% precipitated chalk
75% ethyl alcohol and drying said deposit, whereby penetrant trapped in a defect will be absorbed in the dried deposit to form a visible trace.

2. The method of inspecting a part for surface defects which comprises applying to a surface of said part a solution of a dye dissolved in a solution of dibutyl phthalate and ethylene glycol monobutyl ether, cleaning said surface, depositing a coating of finely divided chalk on said surface from a liquid suspension of said chalk, and drying said deposit whereby components of said solution trapped in a defect will be visibly absorbed in the dried deposit.

3. The method of inspecting a part for surface defects which comprises cleaning a surface of said part, applying to the cleaned surface a penetrant solution containing from 25% to 50% by volume of dibutyl phthalate and a dye, dissolved in a diluent having a lower viscosity, lower surface tension and a higher volatility than that of said dibutyl phthalate, removing penetrant solution from said surface, and depositing on said surface a layer of finely divided penetrant solution absorbing material of a color contrasting with that of said dye, whereby penetrant solution trapped in a defect will be absorbed in said deposit to form a visible trace.

4. The method of inspecting a part for surface defects which comprises applying to a surface of said part a solution of a dye in a penetrant liquid consisting of a volatile liquid and a relatively non-volatile liquid having a higher surface tension than said volatile liquid, said relatively non-volatile liquid consisting essentially of an oxygen-containing organic liquid, removing penetrant liquid from the surface to permit evaporation of part of the volatile liquid from the penetrant liquid remaining in the defect whereby there is an increase in the surface tension of liquid in said defect, and depositing on said surface a layer of finely divided penetrant liquid absorbing material of a color contrasting with that of said dye whereby penetrant liquid will be absorbed in said deposit to form a visible trace.

5. The method of inspecting a part for surface defects which comprises applying to a surface of said part a penetrant liquid containing a dye and from 50% to 75% of a volatile liquid, and the balance being a relatively non-volatile liquid consisting essentially of an oxygen-containing organic liquid and having a higher surface tension than said volatile liquid, removing penetrant liquid from the surface to permit evaporation of part of the volatile liquid from the penetrant liquid remaining in the defect whereby there is an increase in the surface tension of liquid in said defect, and depositing on said surface a layer of finely divided penetrant liquid absorbing material of a color contrasting with that of said dye whereby penetrant liquid will be absorbed in said deposit to form a visible trace.

6. The method of inspecting a part for surface defects which comprises applying to a surface of said part a solution of a dye in a penetrant liquid consisting of 50% to 75% volatile portion having a relatively low surface tension as compared to dibutyl phthalate and from 50% to 25% of a relatively non-volatile portion consisting essentially of an oxygen-containing organic liquid having a higher surface tension than said volatile portion, removing penetrant liquid from the surface and evaporating at least a portion of the volatile portion from the remaining penetrant solution whereby there is an increase in surface tension, and depositing on said surface a layer of finely divided penetrant liquid absorbing material whereby penetrant liquid is absorbed in said deposit to form a visible trace.

7. The method of inspecting a part for surface defects which comprises applying to a surface of said part a solution of a dye in a penetrant liquid consisting of a volatile portion and a relatively non-volatile portion consisting essentially of an oxygen-containing organic liquid, and having a higher surface tension than said volatile portion, cleaning said surface, depositing on said surface a coating of finely divided solid from a liquid suspension of said solid, and drying said deposit whereby components of said solution trapped in a defect will be visibly absorbed in the dried deposit.

8. The method of inspecting a part for surface defects which comprises applying to a surface of said part a solution of a dye in a penetrant liquid consisting of 50% to 75% volatile portion having a relatively low surface tension as compared to dibutyl phthalate and from 50% to 25% of a relatively non-volatile portion consisting essentially of dibutyl phthalate and having a higher surface tension than said volatile portion, removing penetrant liquid from the surface and evaporating at least a portion of the volatile portion from the remaining penetrant solution whereby there is an increase in surface tension, and depositing on said surface a layer of finely divided penetrant liquid absorbing material whereby penetrant liquid is absorbed in said deposit to form a visible trace.

9. The method of inspecting a part for surface defects which comprises applying to a surface of said part a solution of a dye in a penetrant liquid consisting of a volatile portion and a relatively non-volatile portion consisting essentially of an oxygen-containing organic liquid, and having a higher surface tension than said volatile portion, cleaning said surface, and applying to said surface a suspension of a finely divided solid in a volatile alcohol whereby on evaporation of the volatile alcohol a coating of finely divided solid is formed and components of said solution trapped in a defect are visibly absorbed in the dried deposit.

LOY W. SOCKMAN.
ELLIOT W. BRADY.

References Cited in the file of this patent

UNITED STATES PATENTS

| Number | Name | Date |
|---|---|---|
| 1,256,130 | Heitman | Feb. 12, 1918 |
| 1,856,370 | Baldwin | May 3, 1932 |
| 2,186,014 | Ellis | Jan. 9, 1940 |
| 2,236,373 | Kowalski | Mar. 25, 1941 |
| 2,340,940 | De Forest | Feb. 8, 1944 |
| 2,405,078 | Ward | July 30, 1946 |
| 2,420,646 | Bloom, Jr. et al. | May 20, 1947 |
| 2,428,559 | Ellis | Oct. 7, 1947 |
| 2,478,951 | Stokely et al. | Aug. 16, 1949 |

FOREIGN PATENTS

| Number | Country | Date |
|---|---|---|
| 224,242 | Switzerland | Feb. 1, 1943 |
| 476,342 | Canada | Aug. 21, 1951 |